(12) United States Patent
Le Mouel et al.

(10) Patent No.: US 10,452,664 B2
(45) Date of Patent: Oct. 22, 2019

(54) DECLARATIVE MAPREDUCE USING REGULAR EXPRESSIONS

(71) Applicant: Oracle International Corporation, Redwood Shores, CA (US)

(72) Inventors: Philippe Le Mouel, Seattle, WA (US); Sai Sudarsan Pogaru, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 216 days.

(21) Appl. No.: 14/719,271

(22) Filed: May 21, 2015

(65) Prior Publication Data

US 2016/0342606 A1    Nov. 24, 2016

(51) Int. Cl.
| | |
|---|---|
| *G06F 16/20* | (2019.01) |
| *G06F 16/2458* | (2019.01) |
| *H04L 29/08* | (2006.01) |
| *G06F 16/11* | (2019.01) |
| *G06F 16/2455* | (2019.01) |
| *G06F 16/242* | (2019.01) |

(52) U.S. Cl.
CPC ...... *G06F 16/2462* (2019.01); *G06F 16/2458* (2019.01); *G06F 16/2465* (2019.01); *H04L 67/2828* (2013.01); *G06F 16/116* (2019.01); *G06F 16/244* (2019.01); *G06F 16/2455* (2019.01); *G06F 16/24564* (2019.01)

(58) Field of Classification Search
None
See application file for complete search history.

(56) References Cited

U.S. PATENT DOCUMENTS

| | | | | |
|---|---|---|---|---|
| 2010/0293196 | A1* | 11/2010 | Roy | G06F 16/2474 707/776 |
| 2013/0290356 | A1* | 10/2013 | Yang | G06F 16/90344 707/755 |
| 2014/0236889 | A1* | 8/2014 | Vasan | H04L 67/1097 707/610 |

(Continued)

OTHER PUBLICATIONS

Aster MapReduce Analytics Foundation User's Guide Version 4.6.3-ua1—Mar. 21, 2012; https://www.nersc.gov/assets/Uploads/AnalyticsFoundation5.0previewfor4.6.x-Guide.pdf (Year: 2012).*

(Continued)

*Primary Examiner* — Mark D Featherstone
*Assistant Examiner* — Diedra McQuitery
(74) *Attorney, Agent, or Firm* — Trellis IP Law Group, PC

(57) ABSTRACT

A system and method for facilitating extracting processing data, in a networked computing environment. An example method includes receiving a signal from a user input device specifying a regular expression. The regular expression includes criteria for extracting data from a database or file, e.g., a text, XML, JSON, or other type of file. A selected function is applied to data that is extracted in accordance with the regular expression via a MapReduce framework. In a more specific embodiment, the method further includes delivering reduced or processed data to a DataBase Management System (DBMS) of a networked enterprise computing environment. The database includes a file with data obtained from one or more databases distributed among one or more servers of the enterprise computing environment.

20 Claims, 5 Drawing Sheets

(56) References Cited

U.S. PATENT DOCUMENTS

2016/0103918 A1* 4/2016 Alekseyev .......... G06F 16/2428
715/810
2016/0170944 A1* 6/2016 Bell .................... G06F 16/958
715/760

OTHER PUBLICATIONS

Aster MapReduce Analytics Foundation User's Guide Version 4.6.3-ual—Mar. 21,2012; https://www.nersc.goV/assets/Uploads/AnalyticsFoundation5.0previewfor4.6.x-Guide.pdf (Year: 2012).*
DuCharme, Bob; "Regular Expression Matching in XSLT2"; Jun. 4, 2003; 6 pages.
Bernier, Robert; "Using Regular Expressions in PostgreSQL" Feb. 2, 2006; 3 pages.

* cited by examiner

DECLARATIVE MAPREDUCE USING REGULAR EXPRESSIONS

BACKGROUND

The present application relates to computing and more specifically to software and associated systems and methods for facilitating selectively retrieving and processing data in a networked computing environment.

Software for facilitating retrieving and processing data is employed in various demanding applications, including big data computing applications, enterprise cloud services, scientific research, and so on. Such applications often demand efficient mechanisms for enabling selective extraction of data from among plural computing resources of a network, and for processing the extracted data.

Efficient mechanisms for selectively extracting and processing data are particularly important in networked enterprise computing environments, which may involve data distributed among thousands of servers, and may further involve running several parallel processes to extract and process the data. Hand coding software to perform custom data extractions and processing can be prohibitively costly and time consuming.

To address this issue, MapReduce frameworks installed on servers of a networked enterprise computing environment may facilitate performing data extractions and processing. An example MapReduce framework includes a mapper that extracts data in accordance with an input script, called the MapReduce job configuration. The extracted data may be distributed among servers of a network, and the extracted data or copies thereof may be shuffled or selectively distributed among network servers. Subsequently, a reducer performs processing on the extracted data. The processing may occur in parallel among different servers of the network.

However, conventionally, MapReduce jobs are hand coded via a scripting language, such as Java or Python. However, such hand coding of MapReduce jobs, which may include writing map functions and reduce functions, remains costly, time consuming, and error prone. The jobs must often be written on a case by case basis, and may not be applicable to operating on different types of payload data retrieved by a mapper, e.g., eXtensible Markup Language (XML) data, JavaScript Object Notation (JSON) data, and so on.

SUMMARY

An example method facilitates extracting and processing data, e.g., via a MapReduce job, in a computing environment, e.g., an enterprise computing environment. The example method includes receiving a signal from a user input device specifying a regular expression, wherein the regular expression includes one or more criteria for extracting data from a database or file, e.g., a text, XML, JSON, or other type of file; determining a function to apply to data be extracted in accordance with the regular expression; providing the regular expression and the function to a MapReduce framework as part of a specification of a MapReduce job; and receiving reduced data matching the criteria and processed in accordance with the function.

In a more specific embodiment, the method further includes delivering the reduced data to a DataBase Management System (DBMS) of a networked enterprise computing environment. The database may include a file obtained from one or more databases distributed among one or more servers of the enterprise computing environment.

The data may be selectively collected from the one or more databases (e.g., a distributed file system) in accordance with the one or more criteria. The MapReduce framework includes a mapper in communication with the one or more databases and/or a file extracted therefrom. The mapper is adapted to receive the regular expression as input and then automatically extract data from the file in response to receipt of the regular expression and associated job configuration, wherein data extracted from the file matches the one or more criteria specified via the regular expression.

In the specific embodiment, the example method further includes providing a first user option to select a dataset from which to extract data in accordance with one or more criteria specified via the regular expression. A second user option enables a user to specify the one or more criteria identifying one or more characteristics of the data to extract from the dataset. A mapper of the MapReduce framework then collects the data and stores resulting collected data in a file. The mapper then applies the regular expression to the collected data in the file, resulting in extracted data, i.e., mapped data, in response thereto.

A third user option enables the user to specify one or more functions to apply to the extracted data. The one or more functions may be implemented via one or more function objects. A reducer of the MapReduce framework applies the one or more function objects to the extracted data, resulting in processed extracted data (called reduced data) in response thereto. The processed extracted data may be provided to the DBMS, whereby the extracted data may be accessible to various enterprise applications.

In the specific embodiment, the example method further includes employing a regular expression generator to automatically generate the regular expression based on input provided via the first user option and the second user option. A MapReduce job configuration generator is then employed to package the regular expression and one or more function objects into a MapReduce job, in combination with information specifying a dataset for which to apply the MapReduce job.

The MapReduce job configuration generator is adapted to receive user input identifying the dataset; user input specifying the one or more criteria for the regular expression; and the one or more functions. The example method further includes employing the MapReduce job configuration generator to automatically construct a MapReduce job configuration, and to automatically submit the resulting MapReduce job configuration to the MapReduce framework.

Hence, certain embodiments discussed herein involve creation of MapReduce jobs that are driven by one or more regular expressions and selected reducer functions. Accordingly, enterprises no longer need to hand code new MapReduce jobs. Enterprises may employ embodiments discussed herein, including a MapReduce framework, to specify data to extract (e.g., via a UI and associated generated regular expression) and then to process the data (e.g., via a selected function object employed by a reducer to process selected data).

Certain embodiments discussed herein enable users to define complex MapReduce jobs without writing code. Such embodiments may enable processing of arbitrary data; not limited to specific types of data or data formats.

Accordingly, certain embodiments discussed herein may obviate the need for hand coding of software to parse documents; hand coding of software to apply conditions to the parsed document to extract the sought data; hand coding of software to apply functions to reduce, i.e., process extracted data, and so on.

A further understanding of the nature and the advantages of particular embodiments disclosed herein may be realized by reference of the remaining portions of the specification and the attached drawings.

DETAILED DESCRIPTION OF EMBODIMENTS

Figure 1:
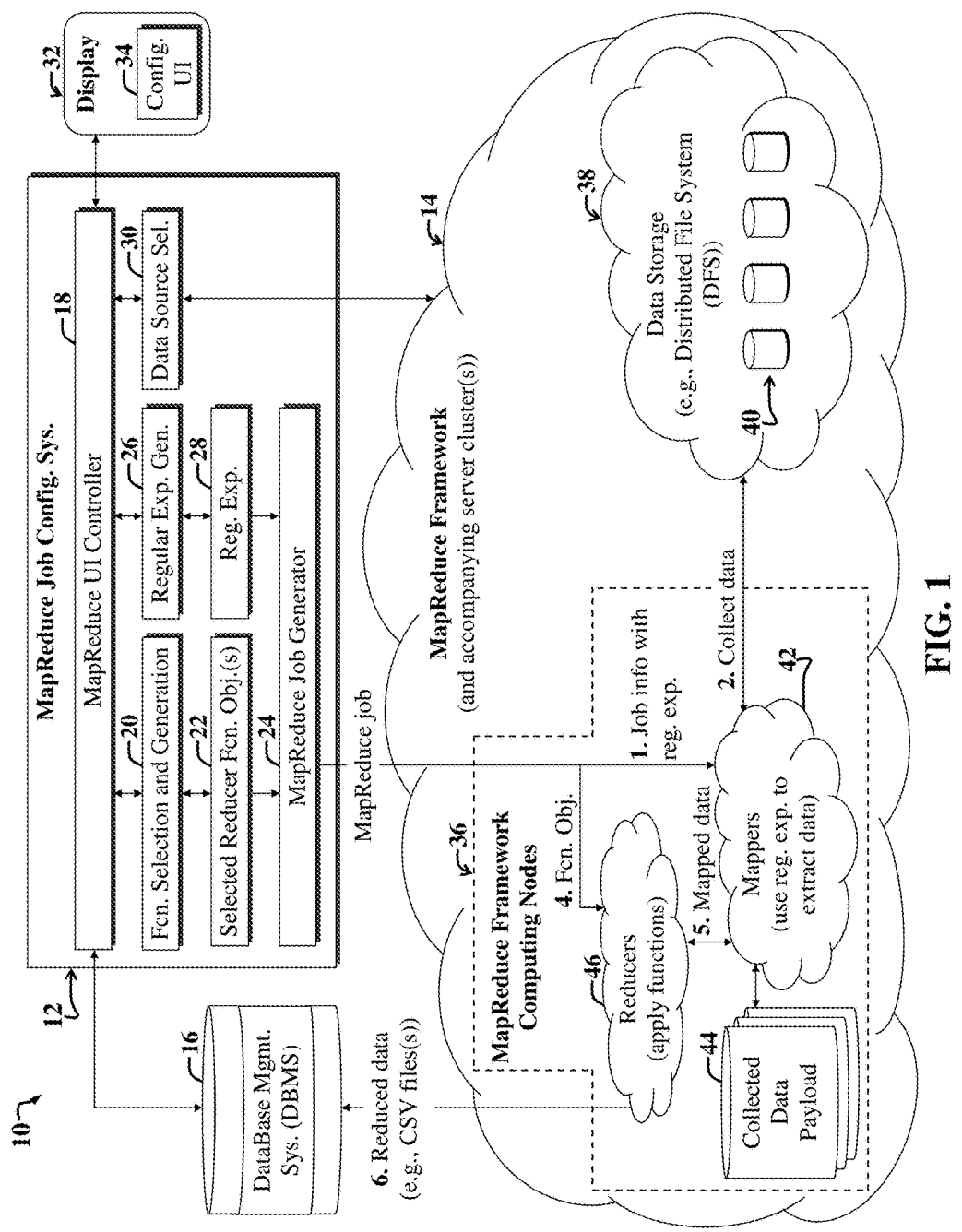
FIG. 1 is a block diagram illustrating a first example system and accompanying enterprise computing environment, which is adapted to facilitate implementation of MapReduce jobs.

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on.

An enterprise computing environment may be any computing environment used for an enterprise. An enterprise may be any organization of persons, such as a business, university, government, military, and so on. The terms "organization" and "enterprise" are employed interchangeably herein.

An example enterprise computing environment includes various computing resources distributed across a network and may further include private and shared content on intranet web servers, databases, files on local hard discs or file servers, email systems, document management systems, portals, and so on. The terms "computing system" and "computing environment" may be used interchangeably herein.

Enterprise software, such as Enterprise Resource Planning (ERP) software, may be any set of computer code that is used by an enterprise or organization. Examples of enterprise software classifications include HCM (Human Capital Management) software, CRM (Customer Relationship Management) software; BI (Business Intelligence) software, and so on. Additional examples of enterprise software include web services managers, service buses, E-business suites, process managers, notification servers, domain administration software, various types of middleware, including Application Programming Interfaces (APIs), and so on.

For the purposes of the present discussion, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. A Service Oriented Architecture (SOA) server may be any server that is adapted to facilitate providing services accessible to one or more client computers coupled to a network.

A networked computing environment may be any computing environment that includes intercommunicating computers, i.e., a computer network. Similarly, a networked software application may be computer code that is adapted to facilitate communicating with or otherwise using one or more computing resources, e.g., servers, via a network.

A networked software application may be any software application or computer code adapted to use data and/or functionality provided via one or more resources, e.g., data, memory, software functionality, etc., accessible to the software application via a network.

Enterprise software applications, including applications for implementing cloud services, are often distributed among one or more servers as part of a computing domain, also called a server domain herein. For the purposes of the present discussion, a computing domain may be any collection of one or more servers running software that is managed by a single administrative server or associated application. An example of a computing domain is a WebLogic Server (WLS) domain.

A cloud service may be any mechanism (e.g., one or more web services, Application Programming Interfaces (APIs), etc.) for enabling a user to employ data and/or functionality provided via a cloud. A cloud may be any collection of one or more servers. For example, certain clouds are implemented via one or more data centers with servers that may provide data, data storage, and other functionality accessible to client devices, such as the smart device behavior analysis and control system 128, via the Internet.

For clarity, certain well-known components, such as hard drives, processors, operating systems, power supplies, Internet Service Providers (ISPs), class loaders, bytecode compilers, job trackers, task trackers, master nodes, slave nodes, and so on, are not necessarily explicitly called out in the figures. However, those skilled in the art with access to the present teachings will know which components to implement and how to implement them to meet the needs of a given implementation.

FIG. 1 is a block diagram illustrating a first example system 10 and accompanying enterprise computing environment, which is adapted to facilitate implementation of MapReduce jobs. The example system 10 includes a MapReduce job configuration system 12 in communication with a MapReduce framework 14 and a DataBase Management System (DBMS) 16.

Note that, in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings.

For the purposes of the present discussion, a MapReduce job may be any collection of computer instructions, e.g., code and data, that specifies data to be collected from a database and computer processing to be applied to the extracted data. The selective extraction of data from the database or file is called mapping, whereas the processing of the extracted data (i.e., mapped data) is called reducing. The process of reducing data may involve applying a function to the data. The function may be implemented as a function object, as discussed more fully below.

An object may be any grouping of or encapsulation of data and/or functionality. Examples of objects include classes or structures implemented via object-oriented programming languages; tables, rows, or records of a database; and so on. Similarly, a database may be any collection of one or more objects. Accordingly, if one or more objects are represented via a file (e.g., a text file, eXtensible Markup Language (XML) file, JavaScript Object Notation (JSON) file, etc.) the file may be called a database for the purposes of the present discussion.

A MapReduce framework may be any software framework that is adapted to implement MapReduce jobs via parallel and/or distributed computing algorithms, e.g., on a server cluster. A framework may be any software computing language abstraction or methodology for implementing a collection of one or more computing tasks.

An example MapReduce framework includes computer instructions for implementing a mapping step, a shuffling step, and a reducing step. An example mapping step involves using worker nodes, i.e., computers, to apply a mapping function to data, and then writing the resulting data to memory. An example shuffling step includes using one or more worker nodes to selectively distribute data among other computing nodes in accordance with a MapReduce job. An example reducing step uses worker nodes to process the distributed data in parallel in accordance with the mapping function.

An example of a software framework that implements a MapReduce framework is Apache Hadoop. Those skilled in the art with access to the present teachings will appreciate that the Apache Hadoop framework may be employed to facilitate implementing embodiments discussed herein, without undue experimentation and without departing from the scope of the present teachings.

The example MapReduce job configuration system 12 includes a MapReduce User Interface (UI) controller 18, which includes computer code for generating and communicating with a MapReduce configuration UI 34 presented via a display 32. The MapReduce UI controller 18 further communicates with a function selection and generation module 20, a regular expression generator 26, and a data source selection module 30.

The function selection and generation module 20 is adapted to provide one or more user selected and/or custom developed reducer function objects 22 in response to user input provided via the MapReduce configuration UI 34. Similarly, the regular expression generator 26 is adapted to output a regular expression 28 in accordance with user input provided via the MapReduce configuration UI 34.

For the purposes of the present discussion, a regular expression may be any portion of computer code that is adapted to specify a pattern or condition with which to match data, e.g., a target string. The condition may identify one or more sought characteristics of data to be selected from a larger collection of data. Generally, a regular expression includes one or more so-called atoms, which represent conditions or criteria.

A function object may be any computer function that is represented as a computing object that may be passed to other functions or procedures like a function or that may be otherwise called like a function. A function may be any collection of computer code that is adapted to implement software functionality. Software functionality may be capability or feature that is provided via computer code, i.e., software. Software functionality is often accessible via use of a UI and accompanying UI controls and features. Software functionality may include actions, such as retrieving data pertaining to a computing object (e.g., business object); performing an enterprise-related task, such as promoting, hiring, and firing enterprise personnel, placing orders, calculating analytics, launching certain dialog boxes, performing searches, and so on.

Selected reducer function objects 22 and a regular expression 28 specifying criteria, e.g., filter criteria, for selecting and extracting data from a database, e.g., from one or more locally stored files 44 (also called the collected data payload) and/or from a Distributed File System (DFS) 40, are provided to a MapReduce job generator 24. The MapReduce job generator 24 is adapted to format the function objects 22 and regular expression 28 into a MapReduce job that is usable by the MapReduce framework 14. The MapReduce job generator 24 may be configured to automatically generate scripts for use by the MapReduce framework 14.

The example MapReduce framework 14 includes MapReduce framework computing nodes (e.g., servers) 36 in communication with data storage mechanisms 38, e.g., a Distributed File System (DFS) that includes plural data storage nodes 40, e.g., servers running databases for storing enterprise data. The MapReduce framework computing nodes 36 include reducers 46 (e.g., servers adapted to perform reducing functions, i.e., to process extracted or mapped data) in communication with mappers 42 (e.g., servers adapted to extract or collect data matching certain criteria specified via one or more regular expressions 28).

A MapReduce job is forwarded to mappers 42 of the MapReduce framework computing nodes 36. In the present example, embodiment, one or more of the mappers 42 include computer code for extracting selected data from the distributed data storage 38 and accompanying data nodes 40. The selection may be in accordance with a user data selection made via the data source selection module 30. Alternatively, or in addition, collected data is filtered in accordance with one or more criteria, e.g., data filter parameters (e.g., which might specify, for example, a date range for data objects to be retrieved) set forth in the regular expression 28.

Note that in certain embodiments, when a user selects a data source, e.g., via functionality provided via the data source selection module 30, the selected data is said to be loaded into the MapReduce framework 14. Information identifying a selected data source may be incorporated into a MapReduce job forwarded to the mappers 42 and reducers 46 of the MapReduce framework 14.

In the present example embodiment, selected data is collected from the data storage 38 and maintained as collected data payload 44. Data of the collected data payload 44 is then accessible to the reducers 46 via the mappers 42. The reducers 46 are adapted to process data of the collected data payload 44 in accordance with one or more function objects specified in the MapReduce job (also called the MapReduce job configuration) received from the MapReduce job configuration system 12.

Alternatively, the collected data payload 44 has yet to be mapped or filtered in accordance with criteria specified in the regular expression 28. The mappers 42 then apply the criteria to the collected data payload, resulting in mapped or filtered data, which is then forwarded to the reducers 46 for further processing in accordance with selected function objects 22 specified in the MapReduce job.

The reducers 46 process mapped data from the mappers 42, yielding one or more output files in response thereto. The reduced data may be forwarded to the DBMS 16 as Comma-Separated Values (CSV) files or other file types. The exact format of the output files is implementation specific and may vary, without departing from the scope of the present teachings.

The reduced data maintained via the DBMS 16 and associated databases may then be accessible to other enterprise applications, e.g., Business Intelligence (BI), Customer Relationship Management (CRM), and so on. Alternatively and/or in addition, reduced data is forwarded directly to a server, e.g., an administration server of a cluster, that runs the MapReduce job configuration system 12, and which may be user accessible via the configuration UI 34 presented on the display 32 used by the MapReduce job configuration system 12.

A MapReduce job might involve, for example, a mapping step that includes extracting or collecting text of invoices for the past ten years. The "past ten years" represents a type of filter criteria, also called mapper criteria or filter parameter, which may be specified via the regular expression 28. Another mapper criteria might involve, for example, invoices for a given region or state.

An example reducing step might involve totaling the collected invoices for each state for the past ten years to arrive at a total amount paid per region or state. Another reducing step might involve determining a count of the past ten years of invoices attributed to a particular customer. Processes for implementing the totaling, e.g., "Sum" are implemented via one or more function objects used by the reducers 46.

Example pseudo code representing a regular expression that may be generated by the regular expression generator 26 of the MapReduce job configuration system 12 includes:

---

Xyz.JobDriver /SomeData.txt /output
"^.*?(?:<[^:]*:)?OrderDate>([^<]*)</(?:[^:]*:)?OrderDate>.*?(?:<[^:]*:)
?OrderTotal>([^<]*)</(?:[^:]*:)?OrderTotal>.*?(?:<[^:]*:)?StateProvince>
([^<]*)</(/(?:[^:]*:)? StateProvince>"

--- where the various symbols (e.g., "[^]", "( )", "?", and so on) represent regular expression metacharacters that facilitate specification of regular expression criteria used to extract, i.e., map data, from a data source, e.g., from the collected data payload 44 and/or from the distributed data storage 38. The above regular expression would extract 3 values from each processed input: OrderDate; OrderTotal Hence, the system 10 is adapted to facilitate retrieving selected data; filtering the data; then processing the filtered data in distributed computing environments, such as enterprise computing environments involving one or more servers in communication with client devices. Various MapReduce functions and operations may be implemented in accordance with existing MapReduce frameworks, without departing from the scope of the present teachings. Those skilled in the art will appreciate that a MapReduce job configuration system, e.g., the system 12, may be adapted to employ regular expressions to facilitate MapReduce job configurations that may be usable with various types of MapReduce frameworks, such as the Apache Hadoop MapReduce framework.

Conventionally, MapReduce jobs are hand coded, e.g., in Java or Python programming languages and provided as MapReduce job scripts applied to a pre-collected data payload. The hand-coded scripts would parse document data, e.g., XML data before reducer logic was applied. However, this can be time consuming, error prone, and costly, as each MapReduce had to be handled by hand-written mappers, reducers, and job configurations. Use of embodiments discussed herein overcome these issues, in part by enabling rapid development and launching of MapReduce jobs by leveraging regular expressions to not only match data based on criteria (encoded in the regular expression(s)) but to extract (i.e., map) the data for used by a reducer.

Figure 2:
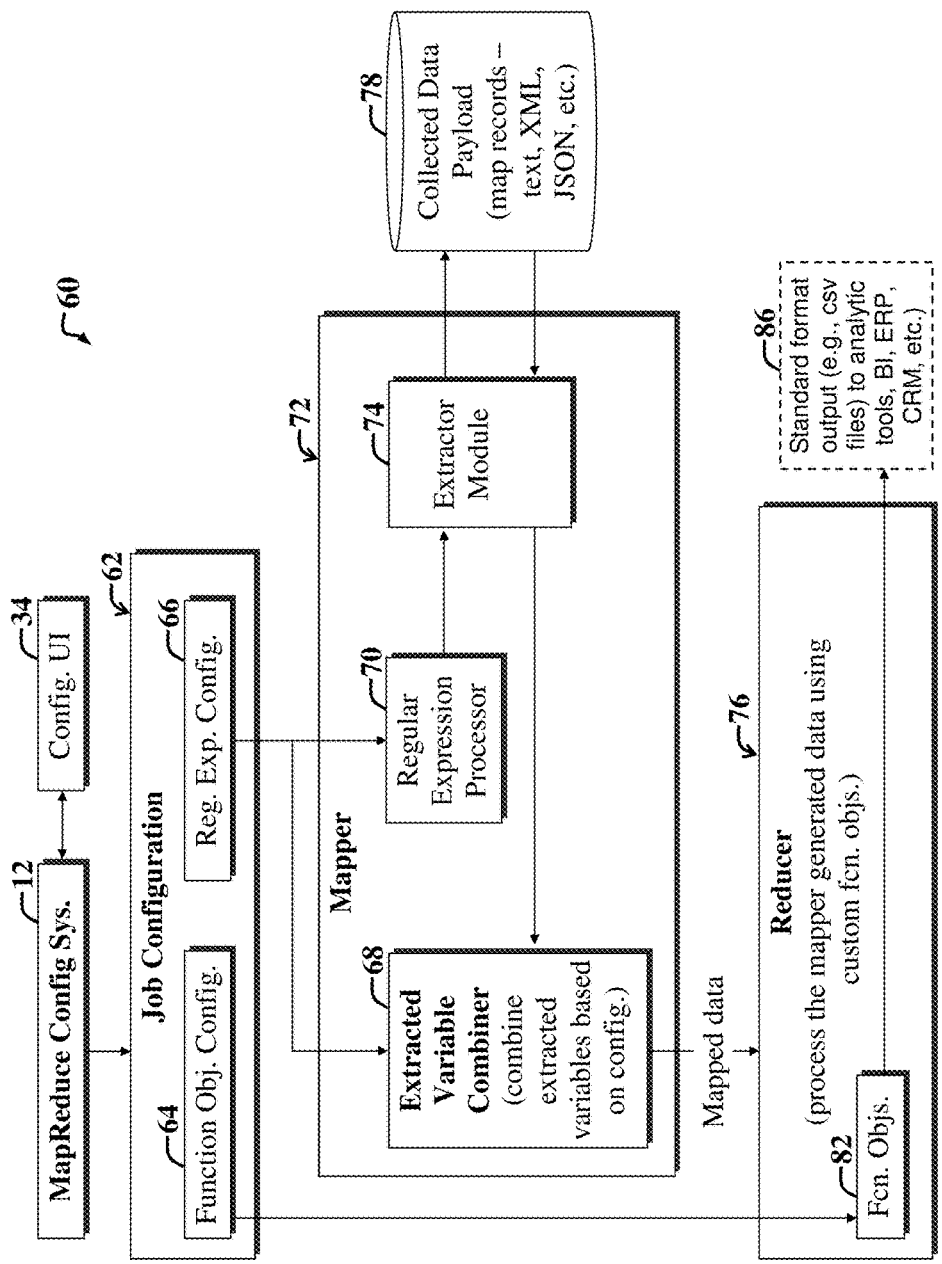
FIG. 2 is a block diagram illustrating a second example system, including example modules of a MapReduce framework.

FIG. 2 is a block diagram illustrating a second example system 60, including example modules 72, 76 of a MapReduce framework. The example system 60 includes a MapReduce configuration system 12 and configuration UI 34, which may be similar to the MapReduce configuration system 12 and configuration UI 34 of the system 10 of FIG. 1.

The MapReduce configuration system 12 outputs a MapReduce job, also called a job configuration 62, which includes a function object configuration 64 and a regular expression configuration 66. The function object configuration 64 includes or otherwise specifies one or more function objects 82 (which may be passed among computing resources like programming language objects, while used like functions) for use by the reducer 76 to process mapped data output by the mapper 72. The function object configuration 64 may include automatically generated or retrieved scripting code in accordance with user input provided by the configuration UI 34. The exact type of scripting code used is implementation specific and may vary, but is suitable for use with the reducer 76.

Similarly, the regular expression configuration 66 includes or otherwise specifies one or more regular expressions 66 and associated data filter criteria for use by the mapper 72. The regular expression configuration 66 may include automatically generated scripting code based on user input provided via the configuration UI 34.

The mapper 72 includes a regular expression processor 70 (which may be optional) 70, which is adapted to process the regular expression configuration 66 and then use parameters or atoms and metacharacters of the regular expression configuration 66 to control an extractor module 74, which extracts data from a collected data payload 78 in accordance with filter criteria specified in the regular expression configuration 66.

The extractor module 74 provides extracted filtered data that matches regular expression conditions or criteria to an extracted variable combiner 68. The extracted variable combiner 68 is adapted to combine variables of the extracted data output by the extractor module 74 in accordance with the regular expression configuration 66, resulting in mapped data that is forwarded to the reducer 76. Note that the mapped data may be stored in memory that is then accessed by the reducer 76.

The reducer 76 is adapted to use the function objects 82 to process the mapped data. For example, the function objects 82 may include a "Sum( )" function object for selectively summing or adding one or more variables of the mapped data in accordance with the function object configuration 64. The reducer 76 outputs processing results 86 as reduced data 86, which may be in a standard or widely used format, such as CSV. The reducer output 76 may then be used by other network resources, e.g., via a DBMS that may be queried by other enterprise software applications.

Note that the collected data payload 78 may be considered part of the mapper 72 or may otherwise be stored on the same computer of the mapper 72, without departing from the scope of the present teachings. The collected data payload 78 may be preloaded by a user into the mapper 72, e.g., via manipulation of the configuration UI 34. Alternatively, the collected data payload 78 is distributed among computing resources of a network.

In an example scenario, a user wishes to extract text of particular invoices from a collection of invoices. The regular expression configuration 66 may specify how to extract invoices, e.g., for the last ten years. The regular expression configuration 66 may also specify that the extracted data be for one or more regions or states or otherwise be organized in accordance with region or state.

The function object configuration 64 may specify that invoice totals for years should be summed. Another function object in the function object configuration 64 may specify that the number of invoices for a given period should be totaled. Another function object may specify that the order amounts should be averaged. Such functions, e.g., Sum( ), Count( ), Average( ), etc., are selectively applied by the reducer 76 to extracted or mapped data output by the mapper 72.

In summary, the second example system 60 is adapted to use (e.g., via the regular expression processor 70 and extractor module 74) a regular expression in a mapper (e.g., the mapper 72) to selectively extract variables from a payload of records (e.g., the collected data payload 78). Text or data is not only matched via the regular expression (configured as part of a MapReduce job submitted to a MapReduce framework), but any number of variables can be extracted from the collected payload data 78 for subsequent processing by the mapper 72 and reducer 76.

In on embodiment, the data is already pre-extracted to the mapper 72 before the regular expression is applied to the extracted data, whereas in another embodiment, the regular expression configuration 66 is employed by an extractor 74 of a mapper to extract data from data storage. Accordingly, extraction of data from a distributed file system may occur in steps, without departing from the scope of the present teachings.

A job configuration 62 is used to combine extracted variables (e.g., via the extracted variable combiner 68) to form the output (i.e., mapped data) of the mapper 72. Configurable and/or customizable function objects 82 in the reducer 76 facilitate processing mapped data to yield the reducer output 86 in a standard file format.

Accordingly, the system 60, may represent a type of framework that enables users to readily and efficiently develop any number of MapReduce jobs, which may accommodate many different types of payloads, without extensive code writing.

Figure 3:
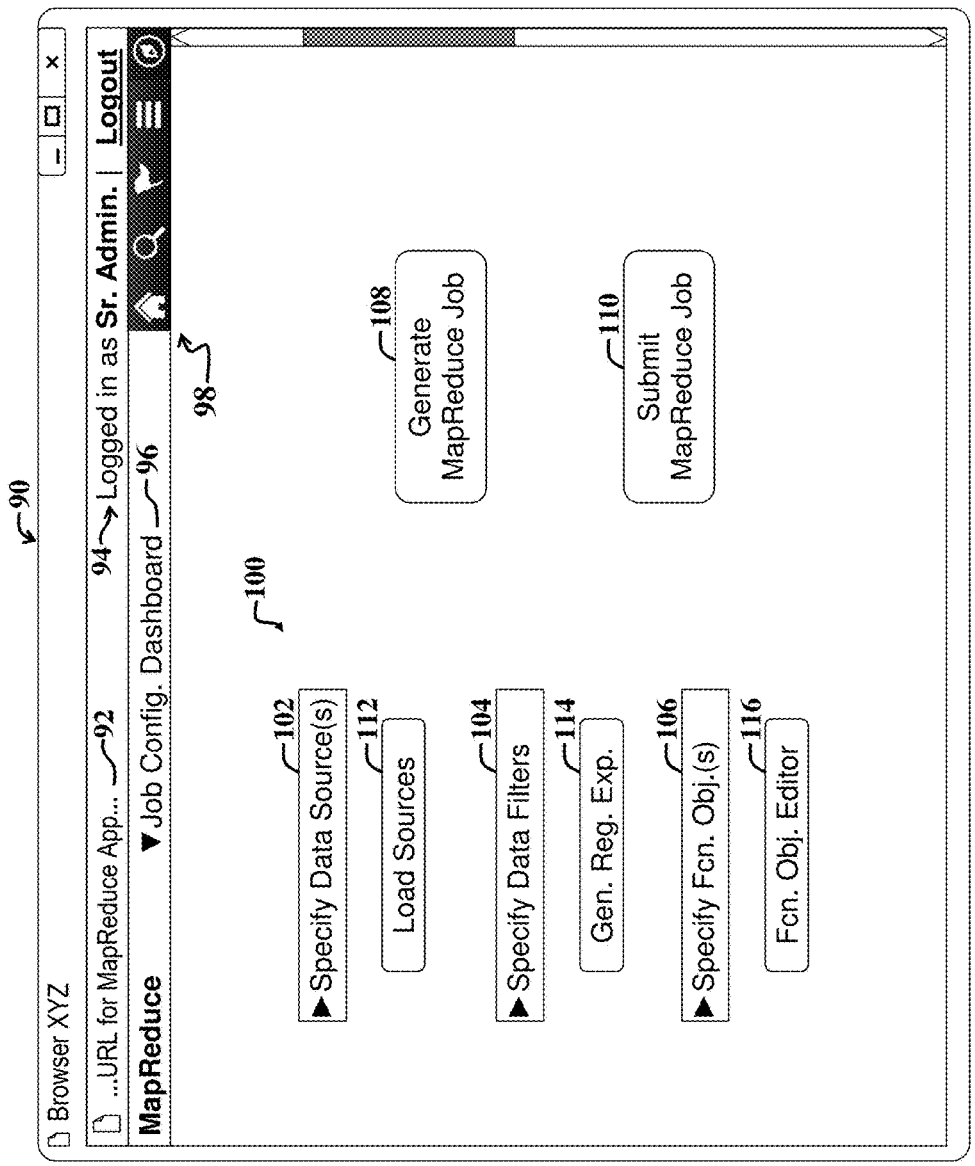
FIG. 3 illustrates an example user interface display screen for configuring and launching a MapReduce job via the systems of FIGS. 1-2.

FIG. 3 illustrates an example UI display screen 90 for configuring and launching a MapReduce job via the systems 10, 60 of FIGS. 1-2. The UI display screen 90 may be implemented as part of the configuration UI 34 of FIGS. 1 and 2.

For the purposes of the present discussion, a UI display screen may be any software-generated depiction presented on a display. Examples of depictions include windows, dialog boxes, displayed tables, and any other graphical user interface features, such as user interface controls, presented to a user via software, such as a browser. A user interface display screen contained within a single border is called a view or window. Views or windows may include sections, such as sub-views or sub-windows, dialog boxes, graphs, tables, and so on. In certain cases, a user interface display screen may refer to all application windows presently displayed on a display.

The example UI display screen 90 is implemented via a browser window, which may be accessible via a Uniform Resource Locator (URL) 92 (or Uniform Resource Identifier (URI). Login indicia 94 indicates that a user has logged in as a senior administrator and is displaying a job configuration dashboard 96. Additional UI controls 98 may facilitate accessing settings and/or otherwise navigating the underlying configuration UI.

For the purposes of the present discussion, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, wherein the input affects a UI display screen and/or accompanying software application associated with the software.

The example UI display screen 90 further includes various job configuration UI controls 100, including a menu 102 for specifying data sources 102 and a button 112 to load data sources (e.g., to make accessible to a mapper as a data payload) specified in the data source menu 102; a menu for specifying data filters 104 a button 114 for triggering automatic generation of a regular expression in accordance with the filters specified via the data filters menu 104; a menu 106 for specifying and/or selecting function objects for use by a mapper and a button 116 for triggering launch of a function object editor.

After a user has completed manipulating the controls 102-116, the user may trigger generation of a MapReduce job configuration by selecting a generate button 108. Upon generation of a MapReduce job, the generated job may be submitted to a MapReduce framework for implementation, e.g., in response to user selection of a submit button 110.

Note that user selection of the various UI controls 102-116 may result in display of other UI display screens, e.g., windows, dialog boxes, etc., for facilitating obtaining additional user input and/or interaction. Furthermore, note that functionality provided via the controls 102-116 may be implemented differently than that shown. For example, the controls 102-116 may be implemented via a series of one or more prompts, e.g., via a job configuration wizard, without departing from the scope of the present teachings.

Figure 4:
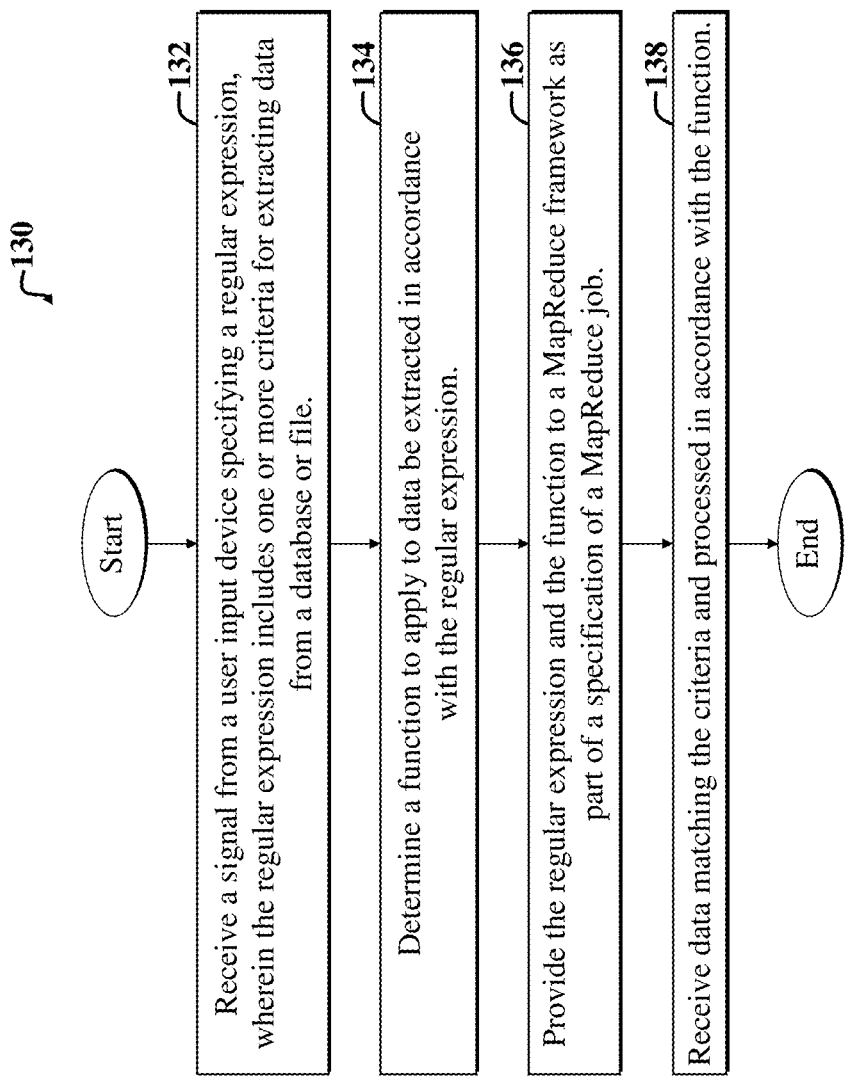
FIG. 4 is a flow diagram of a first example method adapted for use with the embodiments of FIGS. 1-3.

FIG. 4 is a flow diagram of a first example method 130 adapted for use with the embodiments of FIGS. 1-3. The example method 130 is adapted to facilitate extracting and processing data in a computing environment.

An initial user input step 132 includes receiving a signal from a user input device (e.g., represented via the UI display screen 90 of FIG. 3 and accompanying display 32 of FIG. 1) specifying a regular expression. The regular expression includes one or more criteria for extracting data from a database, e.g., a file.

A subsequent function-determining step 134 includes determining a function (e.g., Sum( ), Max( ), Count( ), Average( ), etc.) to apply to data be extracted in accordance with the regular expression.

Next, a regular job-providing step 136 includes providing the regular expression and the function to a MapReduce framework as part of a specification of a MapReduce job.

Then, a receiving step 138 receives mapper output, i.e., data matching the criteria specified via the regular expression and processed in accordance with the function.

Note that the method 130 may be altered, without departing from the scope of the present teachings. For example, the method 130 may be further augmented to specify that the receiving step 138 further includes delivering the mapped data to a DBMS of a networked enterprise computing environment.

The database may include a file obtained from one or more databases distributed among one or more servers of the enterprise computing environment. The example method 130 may further include selectively (e.g., in accordance with specified criteria or characteristics specified via a regular expression) collecting data from the one or more databases in accordance with the one or more criteria, and storing the collected data in the file. The method 130 may further specify that the MapReduce framework includes a mapper in communication with the file.

The mapper may be adapted to receive the regular expression as input and then automatically extract data from the file in response to receipt of the regular expression. The data extracted from the file will match the one or more criteria specified via the regular expression.

The example method 130 may further include providing a first user option (e.g., as represented via the UI controls 102, 112 of FIG. 3) to select a dataset from which to extract data in accordance with one or more criteria specified via the regular expression. A second user option (e.g., as represented via the UI controls 104, 114 of FIG. 3) may enable a user to specify the one or more criteria, wherein the one or more criteria specify one or more characteristics of the data to extract from the dataset.

The example method 130 may further include employing a mapper of the MapReduce framework to collect the data and to store resulting collected data in a file. The mapper is then employed to apply the regular expression to the collected data in the file, resulting in extracted data (also called mapped data) in response thereto.

A third user option (e.g., as represented via the UI controls 106, 116 of FIG. 3) enables a user to specify one or more functions to apply to the extracted data. The one or more functions are maintained as or otherwise implemented via one or more function objects.

The example method 130 may further include employing a reducer of the MapReduce framework to apply the one or more function objects to the extracted data, resulting in processed extracted data in response thereto. The extracted data may be maintained in or otherwise managed via a DBMS and accompanying databases and software.

A regular expression generator (e.g., the generator 26 of FIG. 1) may be employed to automatically generate the regular expression based on input provided via the first user option and the second user option. A MapReduce job configuration generator (e.g., as represented via the generator 24 of FIG. 1) may package the regular expression and one or more function objects into a MapReduce job, in combination with information specifying a dataset for which to apply or run the MapReduce job.

The MapReduce job configuration generator may be adapted to receive user input identifying the dataset; user input specifying the one or more criteria for the regular expression; and the one or more functions. The MapReduce job configuration generator may automatically construct a MapReduce job configuration, which may be automatically (or in response to user input) submitted to a MapReduce framework.

Figure 5:
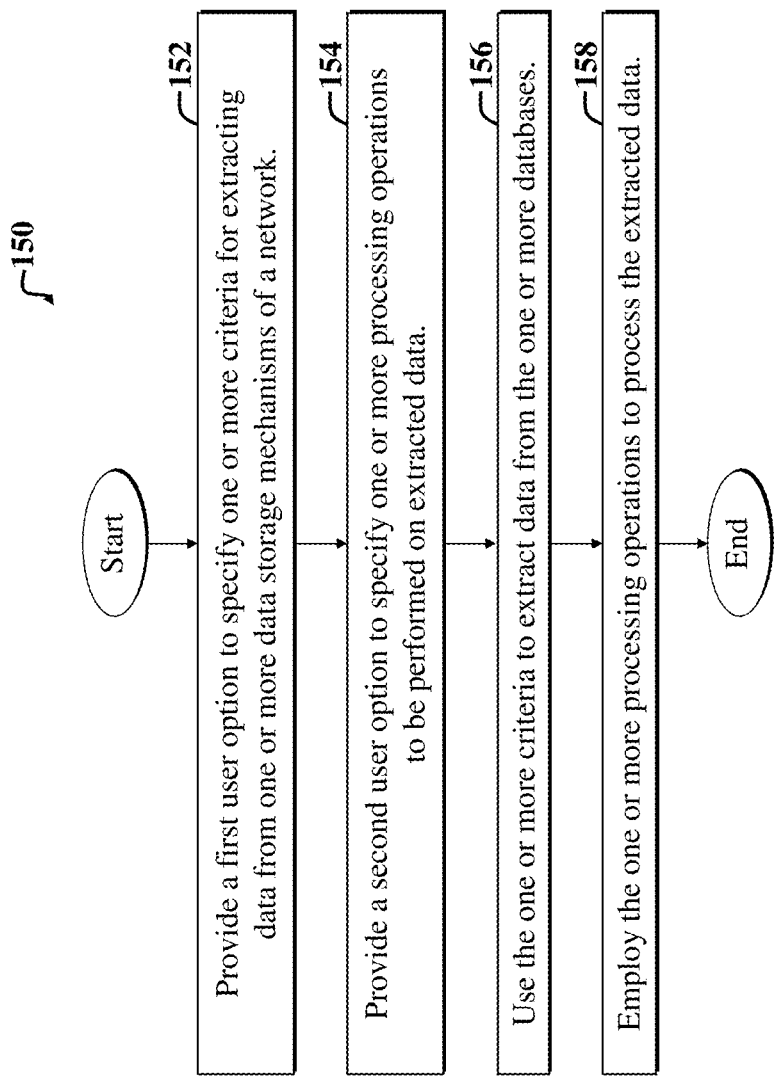
FIG. 5 is a flow diagram of a second example method adapted for use with the embodiments of FIGS. 1-3.

FIG. 5 is a flow diagram of a second example method 150 adapted for use with the embodiments of FIGS. 1-3. The second example method 150 includes a first step 152, which involves providing a first user option to specify one or more criteria for extracting data from one or more data storage mechanisms of a network.

A second step 154 includes providing a second user option to specify one or more processing operations to be performed on extracted data, e.g., via one or more function objects.

A third step 156 includes using the one or more criteria to extract data from the one or more databases or files.

A fourth step 158 includes employing the one or more processing operations to process the extracted data.

The method 150 may be altered without departing from the scope of the present teachings. For example, the method 150 may be adapted to further specify that the third step 156 further includes incorporating a specification of the one or more criteria provided by the first user option into a regular expression, and then delivering the regular expression to a mapper of a MapReduce framework.

The MapReduce framework may be implemented as an Apache Hadoop MapReduce framework. The fourth step 158 may further include delivering a function object to a reducer of a MapReduce framework.

The one or more databases used in the third step 156 may represent one or more data storage mechanisms of a networked enterprise computing environment, e.g., a server cluster and associated software.

In summary, certain embodiments discussed herein set forth teachings for a declarative MapReduce framework that uses regular expressions to extract data from map records (e.g., collected data payload 78 of FIG. 2) and uses function objects to reduce the data produced by the mapper. Such embodiments enable users to define complex MapReduce jobs without writing code, and facilitate processing arbitrary data.

Regular expressions may be provided to the MapReduce framework when a job is submitted. Regular expressions are used to process mapper records to extract relevant data, e.g., data matching user specified criteria. The mapper payload may be XML, text, JSON, or other type of format. The regular expressions are not only usable to match text but more importantly can be used to capture relevant data by leveraging capturing parenthesis. For example, an XML file (or other file type) may be used to capture data, such as customer identification, order amount, etc. Such data may represent variables that may then be selectively combined to produce mapper output.

Variables captured by the regular expression are combinable based on the job configuration to generate the mapper output. Reducer custom function objects may be provided when the MapReduce job has started, and mapper data is to be processed in the reducer. The MapReduce framework may provide many predefined custom function objects (e.g., Sum( ), Min( ), Max( ), Count( ), etc.).

Data may be output (e.g., from the reducer) in standard format such, such as CSV files that can be further processed by analytic tools; visualized in a spreadsheet application, and so on.

Although the description has been described with respect to particular embodiments thereof, these particular embodiments are merely illustrative, and not restrictive. For example, while various embodiments are discussed herein with reference to networked enterprise computing environments, embodiments are not limited thereto. For example, MapReduce jobs may be implemented on a single computer in accordance with embodiments discussed herein, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for facilitating extracting and processing data in a computing environment, the computing environment including one or more servers in communication with one or more client devices, wherein the one or more client devices execute a software, the software executing steps of the method, the method comprising:

employing a user interface menu to provide a first menu option configured to specify a database to extract data therefrom and a second menu option configured to load a subset of data from the database;

prior to filtering a subset of data collected from the database and in response to initiating the first menu option, specifying the subset of data to be extracted from the database, wherein the subset of data is a portion of the database yet to be filtered;

in response to initiating the second menu option, collecting the subset of data from the database before being processed by a regular expression;

receiving from a user input device the regular expression, wherein the regular expression includes one or more criteria encoded in the regular expression and is configured to employ the one or more criteria and a capturing parenthesis to perform a matching data function and a data extraction function for use with a MapReduce job, wherein the MapReduce job includes both the regular expression and one or more function objects which include a plurality of functions used to process the subset of data extracted in accordance with the regular expression;

determining from the one or more function objects a function to apply to the subset of data extracted in accordance with the regular expression;

providing the regular expression and the function to a MapReduce framework as part of a specification of the MapReduce job, wherein the MapReduce framework includes a shuffling process to selectively distribute extracted data from the subset of data among computing nodes in accordance with the MapReduce job;

processing the subset of data using the function to form a processed subset of data; and filtering the processed subset of data by receiving data matching the one or more criteria from the subset of data and processed in accordance with the function to form a filtered version of the subset of data mapped to the computing nodes, wherein at least some of the filtering of the processed subset of data to form the filtered version of the subset of data occurs in an offline mode or a batch mode.

2. The method of claim 1, wherein receiving data further includes delivering the data to a DataBase Management System (DBMS) of a networked enterprise computing environment.

3. The method of claim 2, wherein the database includes a file obtained from one or more databases distributed among one or more servers of the enterprise computing environment.

4. The method of claim 3, further including selectively collecting data from the one or more databases in accordance with the one or more criteria, and storing the collected data in the file.

5. The method of claim 4, wherein the MapReduce framework includes a mapper in communication with the file.

6. The method of claim 5, wherein the mapper is adapted to receive the regular expression as input and automatically extract data from the file in response to receipt of the regular expression, wherein data extracted from the file matches the one or more criteria specified via the regular expression.

7. The method of claim 1, further including employing the first menu option to initiate a first user option to select a dataset from which to extract data in accordance with one or more criteria specified via the regular expression.

8. The method of claim 7, further including employing the first menu option to initiate a second user option to specify the one or more criteria, wherein the one or more criteria specify one or more characteristics of the data to extract from the dataset.

9. The method of claim 8, further including employing a mapper of the MapReduce framework to collect the data and to store resulting collected data in a file.

10. The method of claim 9, further including employing the mapper to apply the regular expression to the collected data in the file, resulting in extracted data in response thereto.

11. The method of claim 10, further including providing a third user option to specify one or more functions to apply to the extracted data.

12. The method of claim 11, further including maintaining the one or more functions as the one or more function objects.

13. The method of claim 12, further including employing a reducer of the MapReduce framework to apply the one or more function objects to the extracted data, resulting in processed extracted data in response thereto.

14. The method of claim 13, further including providing the processed extracted data to a DataBase Management System (DBMS).

15. The method of claim 8, further including employing a regular expression generator to automatically generate the regular expression based on input provided via the first user option and the second user option.

16. The method of claim 15, further including employing a MapReduce job configuration generator to package the regular expression and the one or more function objects into the MapReduce job, in combination with information specifying a dataset for which to apply the MapReduce job.

17. The method of claim 16, wherein the MapReduce job configuration generator is adapted to receive user input identifying the dataset; user input specifying the one or more criteria for the regular expression; and the one or more function objects.

18. The method of claim 17, further including employing the MapReduce job configuration generator to automatically construct a MapReduce job configuration, and to automatically submit the MapReduce job configuration to the MapReduce framework.

19. An apparatus comprising:
a digital processor coupled to a display and to a processor-readable storage device, wherein the processor-readable storage device includes one or more instructions executable by the digital processor to perform the following acts:
employing a user interface menu to provide a first menu option configured to specify a database to extract data therefrom and a second menu option configured to load a subset of data from the database;
prior to filtering a subset of data collected from the database and in response to initiating the first menu option, specifying the subset of data to be collected from the database, wherein the subset of data is a portion of the database yet to be filtered;
in response to initiating the second menu option, collecting the subset of data from the database before being processed by a regular expression;
receiving from a user input device the regular expression, wherein the regular expression includes one or more criteria encoded in the regular expression and is configured to employ the one or more criteria and a capturing parenthesis to perform a matching data function and a data extraction function for use with a MapReduce job, wherein the MapReduce job includes both the regular expression and one or more function objects which include a plurality of functions used to process the subset of data extracted in accordance with the regular expression;
determining from the one or more function objects a function to apply to the subset of data extracted in accordance with the regular expression;
providing the regular expression and the function to a MapReduce framework as part of a specification of the MapReduce job, wherein the MapReduce framework includes a shuffling process to selectively distribute extracted data from the subset of data among computing nodes in accordance with the MapReduce job;
processing the subset of data using the function to form a processed subset of data; and
filtering the processed subset of data by receiving data matching the one or more criteria from the subset of data and processed in accordance with the function to form a filtered version of the subset of data mapped to the computing nodes, wherein at least some of the filtering of the processed subset of data to form the filtered version of the subset of data occurs in an offline mode or a batch mode.

20. A non-transitory processor-readable storage device including instructions executable by a digital processor, the processor-readable storage device including one or more instructions for:
employing a user interface menu to provide a first menu option configured to specify a database to extract data therefrom and a second menu option configured to load a subset of data from the database;
prior to filtering a subset of data collected from the database and in response to initiating the first menu option, specifying the subset of data to be collected from the database, wherein the subset of data is a portion of the database yet to be filtered;
in response to initiating the second menu option, collecting the subset of data from the database before being processed by a regular expression;
receiving from a user input device the regular expression, wherein the regular expression includes one or more criteria encoded in the regular expression and is configured to employ the one or more criteria and a capturing parenthesis to perform a matching data function and a data extraction function for use with a MapReduce job, wherein the MapReduce job includes both the regular expression and one or more function objects which include a plurality of functions used to process the subset of data extracted in accordance with the regular expression;
determining from the one or more function objects a function to apply to the subset of data extracted in accordance with the regular expression;
providing the regular expression and the function to a MapReduce framework as part of a specification of the MapReduce job, wherein the MapReduce framework includes a shuffling process to selectively distribute extracted data from the subset of data among computing nodes in accordance with the MapReduce job;
processing the subset of data using the function to form a processed subset of data; and
filtering the processed subset of data by receiving data matching the one or more criteria from the subset of data and processed in accordance with the function to form a filtered version of the subset of data mapped to the computing nodes, wherein at least some of the filtering of the processed subset of data to form the filtered version of the subset of data occurs in an offline mode or a batch mode.

* * * * *